United States Patent [19]

Sellstedt et al.

[11] 3,873,524

[45] Mar. 25, 1975

[54] 4-OXO-THIAZOL INO/IDINE-5-YLIDENEACETAMIDO PENICILLANIC ACIDS

[75] Inventors: John H. Sellstedt, Pottstown; Daniel M. Teller, Devon; Charles J. Guinosso, King of Prussia, all of Pa.

[73] Assignee: American Home Products Corporation, New York, N.Y.

[22] Filed: Nov. 30, 1973

[21] Appl. No.: 420,408

[52] U.S. Cl. .............................. 260/239.1, 424/271
[51] Int. Cl. .............................................. C07d 99/14
[58] Field of Search ................................. 260/239.1

[56] References Cited
UNITED STATES PATENTS

| | | | |
|---|---|---|---|
| 3,296,250 | 1/1967 | Fraser | 260/239.1 |
| 3,476,743 | 11/1969 | Raap et al. | 260/239.1 |
| 3,781,277 | 12/1973 | Carroll | 260/239.1 |

Primary Examiner—Bernard Helfin
Assistant Examiner—Gerald A. Schwartz
Attorney, Agent, or Firm—Richard K. Jackson

[57] ABSTRACT

Derivatives of 4-oxo-5-thiazolino and thiazolidine-5-ylideneacetamidopenicillanic acid of potent antibacterial activity are produced by acylating 6-aminopenicillanic acid with derivatives of 4-oxo-5-thiazolinylideneacetic acid or 4-oxo-5-thiazolidinylideneacetic acid in the presence of a condensing agent directly or after conversion of the -ylideneacetic acid to an acid halide.

4 Claims, No Drawings

4-OXO-THIAZOLINO/IDINE-5-YLIDENEACETAMIDO PENICILLANIC ACIDS

DESCRIPTION OF THE INVENTION

In accordance with this invention there is provided chemical compounds of the formula:

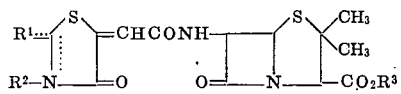

wherein
R$^1$ is a member selected from the group consisting of di(lower)alkylamino and (lower)alkylimino;
R$^2$ is a member selected from the group consisting of -H and (lower)alkyl; and
R$^3$ is a member selected from the group consisting of -H, and an alkali metal cation.

In the preceding paragraph and throughout the specification and claims, the term "lower" is used to modify alkyl, to designate the presence of from one to six carbon atoms in the modified term. The dotted line to R$^1$ and the nitrogen atom designates the presence of a double bond in the (lower)alkylimino derivatives and di(lower)alkylamino derivatives, respectively.

The compounds of this invention are anti-bacterial agents which may be generically described as 6-[(2-dialkylamino and 2-alkylimino-4-oxo-5-thiazolinylidene, and 5-thiazolidinylidene)acetamido]penicillanic acids, and alkali metal salts thereof. Each of these compounds are prepared by reacting the precursor acetic acid derivative with an appropriate 6-aminopenicillanic acid derivative in the presence of a condensing agent such as carbonyl diimidazole, dicyclohexylcarbodiimide, dicyclohexylcarbodiimide in the presence of N-hydroxysuccinimide or 1-hydroxybenzotriazole, isobutylchloroformate, and the like. These and similar condensing agents which are operable in the preparation of the antibacterial agents of this invention are presented in Spencer et al., J. Med. Chem. 9, pp. 746–750 (1966); Micetich et al., J. Med. Chem. 15, pp. 333–335 (1972); Klausner et al., Synthesis, pp. 453–463 (1972) and U.S. Pat. No. 3,338,896.

Alternatively, the precursor acetic acid derivative may be converted by known means to an acid halide which is then used in aqueous medium to acylate the free amino group of either a tertiary amine salt or an alkali metal salt of the 6-amino-penicillanic acid. In addition, the acetic acid halide precursor may be used to react in organic solution with either a tertiary amine salt or a silylated, phosporylated or saccharinated derivative of the 6-amino-penicillanic acid derivative.

The precursor acetic acid derivatives are prepared by reaction of acetylene dicarboxylic acid with a thioamide of the formula:

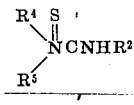

in which
R$^2$ and R$^4$ are hydrogen or lower alkyl and R$^5$ is lower alkyl;
in accordance with the techniques employed with analogous reactants as disclosed by Trivedi et al., J. Indian Chem. Soc., 43, pp. 265–268 (1966); Arakelian et al., J. Org. Chem., 25, pp. 465–467 (1960); and Japanese Patent 11255/66 (Derwent No. 22,031).

Thus, depending upon the group R$^4$, either a 2-dialkylamino derivative is produced, or a 2-alkylimino product is obtained in accordance with the equation

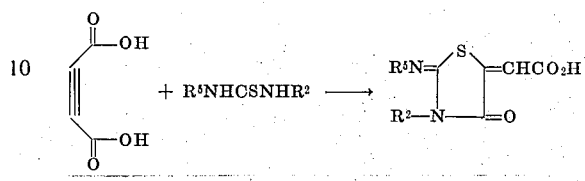

and

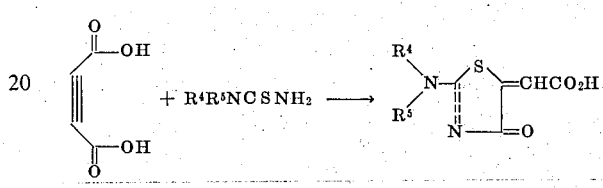

The compounds of this invention are active antibacterials effective against gram-positive and gram-negative test organisms as well as penicillin resistant staphlococcus at an inhibitory concentration at or below 250 micrograms per milliliter using the well known and scientifically accepted agar serial dilution testing technique. Thus, the compounds of this invention are useful in the fields of comparative pharmacology and in microbiology and may be used as growth promotors in animals and for the treatment of infections amenable to treatment with penicillins. The specific activity of the compounds exemplified in the following examples is provided, infra, for those specific bacterial strains against which the compound exemplified was active at a minimum inhibitory concentration at or below 250 micrograms per milliliter. It is to be understood that activity against bacteria other than those specifically listed occurs at concentrations above 250 micrograms per milliliter. The bacteria are named followed by the specific strain and the concentration in micrograms per milliliter at which 100 percent inhibition occurred. The abbreviations for each bacteria are:

ST AU — *Staphylococcus aureus*
BA SU — *Bacillus subtilis*
NE CA — *Neisseria catarrhalis*
SA PA — *Salmonella paratyphi*
KL PN — *Klebsiella pneumoniae*
HE SP — *Herellea species*
ES CO — *Escherichia coli*
BO BR — *Bordetella brochiseptica*
EN AE — *Enterobacter aerogenes*
ES IN — *Escherichia intermedia*
PR VU — *Proteus vulgaris*

The following examples are given by way of illustration and are not be to construed as limitations upon the true scope of the invention. In the working examples the expression APA means aminopenicillanic acid.

EXAMPLE I

6-[2-(2-Dimethylamino-4-oxo-2-thiazolin-5-ylidene)acetamido]-penicillanic acid.

To a solution of 2-dimethylamino-4-oxo-2-thiazolin-5-ylidene-acetic acid (1.00 g, 0.015 moles) in dry dimethylformamide (20 ml) containing triethylamine (1.39 ml) at −10° C. under nitrogen is added all at once isobutyl chloroformate (1.30 ml, 0.02 moles). The mixture is stirred at −10° C. for 10 minutes and a solution of 6-APA (1.08, 0.005 moles) and triethylamine (1.39 ml) in water/dimethyl formamide (1:1, 20 ml) is added all at once. The mixture is stirred at 5° C. for 1 hour and 25° C. for 1 hour. After evaporation in vacuo < 40° C. a solution of 120 ml of water and 40 ml of ethyl acetate is added. The mixture is shaken thoroughly and the organic layer is discarded. The aqueous layer is cooled to 5° C. 120 ml of ethyl acetate is added and the mixture acidified to pH = 3.0 with 10% aqueous hydrochloric acid. The organic layer is separated and the aqueous layer is extracted with 40 ml of ethyl acetate. The combined extract and organic layer is washed with water, brine and dried over anhydrous sodium sulfate. Evaporation in vacuo < 40° C. leaves a solid, m.p. 180° C. (d); $\lambda_{max}^{KBr}$ 5.68, 6.01, 6.30 μ; NMR has 1.50, 1.62, 3.26, 3.33 ppm peaks.

| ST AU | 6538P | 1.95 |
| ST AU | SMITH | 1.95 |
| BA SU | 6633 | 3.90 |
| NE CA | 8193 | 31.3 |
| ST AU | CHP | 31.3 |

EXAMPLE II

6-[2-(3-Methyl-2-methylimino-4-oxo-5-thiazolidinylidene)acetamido]penicillanic acid.

The procedure described in Example 1 is followed, with substitution of 3-methyl-2-methylimino-4-oxo-5-thiazolidinylideneacetic acid (1.00 g, 0.0005 moles) for 2-dimethylamino-4-oxo-2-thiazolin-5-ylidene-acetic acid to yield the title compound. The product acid is converted to the potassium salt with potassium ethyl hexanoate, m.p. 188° C. (d); $\lambda_{max}^{KBr}$ 5.60, 6.10 μ; NMR has 1.50, 1.62, 3.19, 3.25 ppm peaks.

| ST AU | 6538P | .244 |
| ST AU | SMITH | .244 |
| BA SU | 6633 | 1.95 |
| NE CA | 8193 | 3.90 |
| ST AU | CHP | 15.6 |
| HE SP | 9955 | 31.3 |
| SA PA | 11737 | 31.3 |
| ES CO | 9637 | 125 |
| ST AU | 53-180 | 250 |
| BO BR | 4617 | 250 |
| EN AE | 13048 | 250 |
| ES IN | 65-1 | 250 |
| KL PN | 10031 | 250 |
| PR VU | 6896 | 250 |

What is claimed is:
1. A compound of the formula:

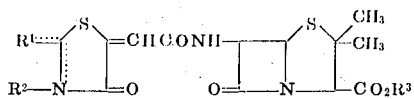

wherein
R¹ is a member selected from the group consisting of di(lower)-alkylamino and (lower)alkylimino;
R² is a member selected from the group consisting of —H and (lower)alkyl; and
R³ is a member selected from the group consisting of —H, and an alkali metal cation.

2. The compound of claim 1 which is 6-[2-(2-dimethylamino4-oxo-2-thiazolin-5-ylidene)acetamido]penicillanic acid.

3. The compound of claim 1 which is 6-[2-(3-methyl-2methylimino-4-oxo-5-thiazolidinylidene)acetamido]penicillanic acid.

4. The compound of claim 1 which is 6-[2-(3-methyl-2methylimino-4-oxo-5-thiazolidinylidene)acetamido]penicillanic acid potassium salt.

* * * * *